US012240687B2

(12) United States Patent
Obermark et al.

(10) Patent No.: US 12,240,687 B2
(45) Date of Patent: Mar. 4, 2025

(54) SECURITY CAGE ENCLOSURE STRUCTURE FOR A CARGO CARRIER

(71) Applicant: Etrailer Corporation, Wentzville, MO (US)

(72) Inventors: Craig Obermark, Union, MO (US); Daniel Perotti, St. Peters, MO (US); Brenden McIntyre, Winfield, MO (US)

(73) Assignee: ETRAILER CORPORATION, Wentzville, MO (US)

( * ) Notice: Subject to any disclaimer, the term of this patent is extended or adjusted under 35 U.S.C. 154(b) by 82 days.

(21) Appl. No.: 17/881,205

(22) Filed: Aug. 4, 2022

(65) Prior Publication Data

US 2024/0043203 A1 Feb. 8, 2024

(51) Int. Cl.
*B60R 9/06* (2006.01)
*B65D 88/12* (2006.01)
*B65D 90/02* (2019.01)

(52) U.S. Cl.
CPC .............. *B65D 90/02* (2013.01); *B65D 88/12* (2013.01)

(58) Field of Classification Search
CPC .... B65D 90/02; B65D 88/12; B65D 21/0211; B65D 21/0234; B60R 9/055; B60R 9/04
See application file for complete search history.

(56) References Cited

U.S. PATENT DOCUMENTS

| 5,042,674 A * | 8/1991 | Ramsay ............. B65D 21/0234 206/508 |
| 6,256,205 B1 * | 7/2001 | Perry ................... H05K 7/1424 361/752 |
| 8,061,571 B2 | 11/2011 | Aghajanian |
| 2010/0224663 A1 | 9/2010 | Butler, III |

* cited by examiner

*Primary Examiner* — Stephen J Castellano
(74) *Attorney, Agent, or Firm* — Sandberg Phoenix & von Gontard, P.C.

(57) ABSTRACT

An enclosure structure in the form of a security cage is attached to a top surface of a cargo carrier as the security cage is assembled on the top surface of the cargo carrier. The assembled security cage enclosure structure encloses and secures objects supported on the cargo carrier in an interior volume of the security cage enclosure structure. The construction of the security cage enclosure structure eliminates the need for separate fastener assemblies to attach the assembled security cage enclosure structure to the top surface of the cargo carrier.

20 Claims, 11 Drawing Sheets

SECURITY CAGE ENCLOSURE STRUCTURE FOR A CARGO CARRIER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

This disclosure pertains to an enclosure structure that is assembled to the top of a cargo carrier. The assembled enclosure structure encloses and secures objects supported on the cargo carrier in the interior volume of the enclosure structure. More specifically, this disclosure pertains to an enclosure structure in the form of a security cage that is attached to a top surface of a cargo carrier as the security cage is assembled on the top surface of the cargo carrier. The construction of the enclosure structure eliminates the need for separate fastener assemblies to attach the assembled enclosure structure to the top surface of the cargo carrier.

BRIEF SUMMARY

The enclosure of this disclosure is constructed in the form of a security cage enclosure structure. The enclosure structure is attachable to a top surface of a cargo carrier solely by being assembled on the top surface of the cargo carrier. There are no fastener assemblies needed to attach the enclosure structure to the cargo carrier.

The enclosure structure has an opening at a bottom of the enclosure structure. The opening provides access to an interior volume of the enclosure structure through the opening.

The enclosure structure has a bottom surface. The bottom surface has a configuration of a border surface that extends entirely around an outer perimeter of the opening at the bottom of the enclosure structure. The bottom surface is positioned in a single bottom plane and is configured to engage in surface contact with a top surface of a cargo carrier when attaching the enclosure structure to the cargo carrier.

In its basic form, the enclosure structure has a first part of the structure or a right side of the enclosure structure and a second part of the structure or a left side of the enclosure structure. The first part and the second part are attached together when assembling the enclosure structure on the top surface of a cargo carrier. When the first part and the second part are assembled on a top surface of the cargo carrier they enclose the interior volume of the enclosure structure above the cargo carrier and attach the enclosure structure to the top surface of the cargo carrier.

More specifically, the enclosure structure has a right side panel and a separate left side panel. The right side panel and the left side panel are positioned on opposite sides of the enclosure structure and on opposite sides of the interior volume of the enclosure structure when assembling the enclosure structure on the top surface of the cargo carrier.

The enclosure structure also has a rear panel and a separate front panel. In one embodiment of the enclosure structure, the rear panel is one piece and the front panel is one piece. In another embodiment of the enclosure structure, the rear panel is a two piece rear panel and the front panel is a two piece front panel. The rear panel and front panel are positioned on opposite rear and front sides of the enclosure structure respectively, and on opposite sides of the interior volume of the enclosure structure when assembling the enclosure structure on the top surface of the cargo carrier. The right side panel and the left side panel are assembled to and attached to opposite ends of the rear panel and opposite ends of the front panel when assembling the enclosure structure around the interior volume of the enclosure structure and when assembling the enclosure structure on the top surface of the cargo carrier.

There is a first projection on the enclosure structure. The first projection could be secured to the enclosure by fasteners or other equivalent means. However, the first projection is preferably not secured by fasteners but is unitary with the enclosure structure. The first projection is on the first part of the enclosure structure. More specifically, the first projection is unitary with the right side panel of the enclosure structure.

There is a second projection on the enclosure structure. The second projection could be secured to the enclosure structure by fasteners or other equivalent means. However, the second projection is preferably not secured by fasteners but is unitary with the enclosure structure. The second projection is on the second part of the enclosure structure. More specifically, the second projection is unitary with the left side panel of the enclosure structure.

The first projection and the second projection are on opposite sides of the enclosure structure and on opposite sides of the bottom surface of the enclosure structure.

The first projection has a vertical portion that projects downward in a perpendicular orientation from the bottom surface of the enclosure structure. The vertical portion projects from the bottom surface of the enclosure structure to a position beneath the bottom surface. When assembling the enclosure structure on the top surface of a cargo carrier, with the bottom surface of the enclosure structure engaged in surface engagement on the top surface of the cargo carrier, the vertical portion of the first projection projects downward from the bottom surface of the enclosure structure to a position beneath the bottom surface of the enclosure structure and beneath the top surface of the cargo carrier The first projection also has a horizontal portion that is unitary with and extends in a perpendicular orientation from the vertical portion. The horizontal portion extends from the vertical portion to a position directly underneath the bottom surface of the enclosure structure and directly underneath the top surface of the cargo carrier when the bottom surface of the enclosure structure is engaged in surface engagement on the top surface of the cargo carrier.

The second projection has a vertical portion that projects downward in a perpendicular orientation from the bottom surface of the enclosure structure. The vertical portion of the second projection projects from the bottom surface of the enclosure structure to a position beneath the bottom surface. When assembling the enclosure structure on the top surface of the cargo carrier, with the bottom surface of the enclosure structure engaged in surface engagement with the top surface of the cargo carrier, the vertical portion of the second projection projects downward from the bottom surface of the enclosure structure to a position beneath the bottom surface of the enclosure structure and beneath the top surface of the cargo carrier.

The second projection also has a horizontal portion that is unitary with and extends in a perpendicular orientation from the vertical portion of the second projection. The horizontal portion extends from the vertical portion to a position directly underneath the bottom surface of the enclosure structure and directly underneath the top surface of the cargo carrier when the bottom surface of the enclosure structure is engaged in surface engagement with the top surface of the cargo carrier.

With the bottom surface of the enclosure structure engaged in surface engagement with the top surface of the cargo carrier, the horizontal portions of the first projection and the second projection extend from the vertical portions of the respective first projection and the second projection to positions directly underneath the bottom surface of the enclosure structure and directly underneath the top surface of the cargo carrier and thereby attach the enclosure structure to the cargo carrier.

The enclosure and specifically the security cage enclosure structure is assembled to the cargo carrier by positioning the first part of the enclosure structure that includes the right side panel and the second part of the enclosure structure that includes the left side panel on the top surface of the cargo carrier. The rear panel of the enclosure structure and the front panel of the enclosure structure are also positioned on the top surface of the cargo carrier. The bottom surface of the enclosure structure which consists of portions of the bottom surfaces of the right side panel, the left side panel, the rear panel and the front panel is engaged in surface engagement with the top surface of the cargo carrier. The first part and the second part of the enclosure structure are assembled together with the vertical portions of the first projection and the second projection projecting downward beneath the top surface of the cargo carrier and with the horizontal portions of the first projection and the second projection extending directly underneath the top surface of the cargo carrier.

With the right side panel and the left side panel, the rear panel and the front panel positioned on the top surface of the cargo carrier, the right side panel and the left side panel are assembled to opposite ends of the rear panel and to opposite ends of the front panel while positioning the horizontal portions of the first projection and the second projection directly underneath the top surface of the cargo carrier. The horizontal portions of the first projection and the second projection being positioned directly underneath the top surface of the cargo carrier attaches the security cage enclosure structure to the cargo carrier.

The features, functions, and advantages of the security cage enclosure structure described above can be achieved independently or in various embodiments, further details of which can be seen with reference to the following description and drawings.

BRIEF DESCRIPTION OF THE DRAWINGS

Corresponding reference numerals will be used throughout the several figures of the drawings and in the following description.

DETAILED DESCRIPTION

The following detailed description illustrates the claimed invention by way of example and not by way of limitation. This description will clearly enable one skilled in the art to make and use the claimed invention, and describes several embodiments, adaptations, variations, alternatives and uses of the claimed invention, including the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

As represented in the drawing figures, the enclosure of this disclosure is constructed as a security cage enclosure structure 10. The enclosure structure 10 is attachable to a top surface of a cargo carrier 12 solely by being assembled on the top surface of the cargo carrier. There are no fastener assemblies needed to attach the enclosure structure 10 to the cargo carrier 12.

A typical cargo carrier 12 is represented in FIGS. 2 and 10-12. Because cargo carriers of various types are known, the cargo carrier 12 is only generally described herein. The cargo carrier 12 is of a type that is releasably attachable to a hitch receiver tube on the rear of a vehicle. The cargo carrier 12 is basically a support platform. The cargo carrier 12 has a platform surface 14 that is represented in the drawings as having a general rectangular configuration. A carrier rail 16 extends around the platform surface 14. The carrier rail 16 also has the general rectangular configuration of the platform surface 14. Several vertical columns 18 extend between the outer perimeter of the platform surface 14 and the carrier rail 16. The columns 18 are secured between the platform surface 14 and the carrier rail 16 and support the carrier rail in its position spaced above the platform surface 14. The carrier rail 16 has a top surface 20 that defines the top surface 20 of the cargo carrier 12. The carrier rail top surface 20 is positioned in a single plane. The single plane of the carrier rail top surface 20 is generally horizontally oriented. The carrier rail 16 also has an opposite bottom surface 22.

The construction of the cargo carrier 12 represented in FIGS. 2 and 10-12 and described above is typical of commonly known and commonly available cargo carriers. The dimensions of cargo carriers may be different, but the commonly known and commonly available cargo carriers have the basic construction and configuration of the cargo carrier 12 represented in FIGS. 2 and 10-12. It should be understood that the security cage enclosure structure 10 of this disclosure is designed to be used with a variety of different types of cargo carriers and is not limited to use with the cargo carrier 12 shown and described herein.

As stated earlier, the enclosure structure 10 is constructed to be attachable on the top surface 20 of a cargo carrier 12 such as that represented in FIGS. 2 and 10-12. The enclosure structure 10 is constructed in the form of a security cage enclosure structure 10. The enclosure structure 10 to be described is constructed of materials that provide the enclosure structure with sufficient strength to function in its intended manner, such as metal materials, plastic materials that can be fused or adhered together tom form a unitary structure or other equivalent materials.

The enclosure structure 10 has several vertically oriented columns that are spatially arranged around the enclosure structure 10. The columns are secured together by several horizontally oriented rails or bars. The columns and bars form the "cage" of the enclosure structure 10. The enclosure structure 10 could have other constructions. For example, the enclosure structure 10 could be constructed of solid panels that extend completely around and over the enclosure structure and prevent any access, visually or otherwise to the interior volume of the enclosure structure 10 through the panels. The enclosure structure 10 of this disclosure is not limited to the cage construction of the enclosure structure represented in the drawings.

The enclosure structure 10 is represented in the drawings as being constructed with a bottom most horizontal bar 28. The bottom bar 28 is comprised of several bar segments positioned end to end. The bar segments arranged end to end give the bottom bar a general rectangular configuration that extends entirely around the bottom of the enclosure structure 10. The bottom bar 28 has a bottom surface 30 that also extends entirely around the enclosure structure 10. The bottom surface 30 of the bottom bar 28 defines a bottom surface 30 of the enclosure structure 10. The bottom surface 30 also defines an outer perimeter border of a bottom opening 32 through the bottom of the enclosure structure 10 that provides access into an interior volume 34 of the enclosure structure. The bottom surface 30 is positioned in a single bottom plane and is configured to engage in surface contact with the top surface 20 of the cargo carrier 12 defined by the top surface of the carrier rail 16. As represented in the drawings, the bottom surface 30 of the enclosure structure 10 has a configuration that matches the configuration of the top surface 20 of the carrier rail that defines the top surface of the cargo carrier 12. When attaching the enclosure structure 10 to the cargo carrier 12 as will be explained, the entire bottom surface 30 of the enclosure structure 10 engages in surface contact with the entire top surface 20 of the cargo carrier 12. This is an important feature that contributes to securely attaching the enclosure structure 10 to the cargo carrier 12

Figure 1:
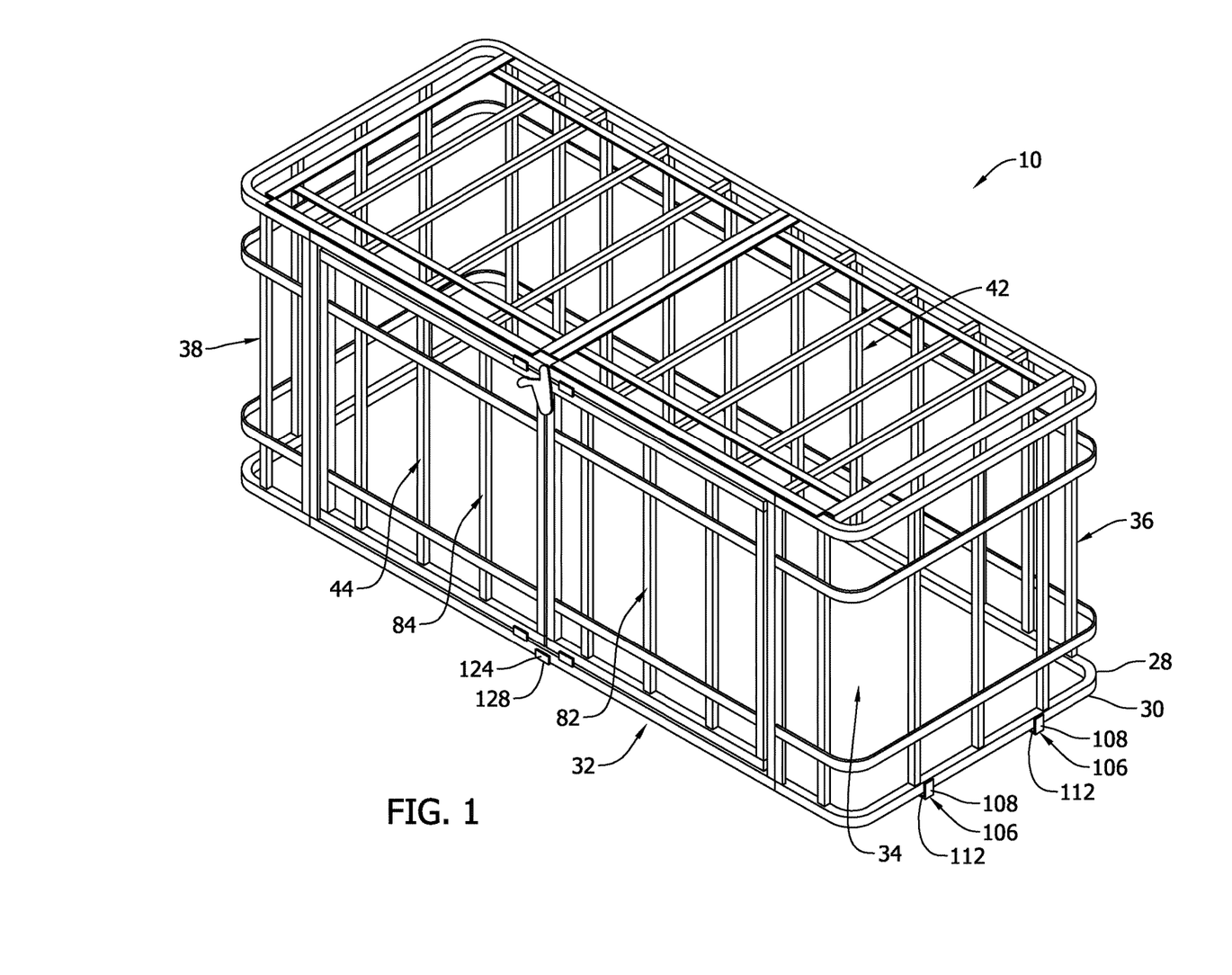
FIG. 1 is a representation of a top, right side perspective view of the front of the security cage enclosure structure of this disclosure.
Figure 10:
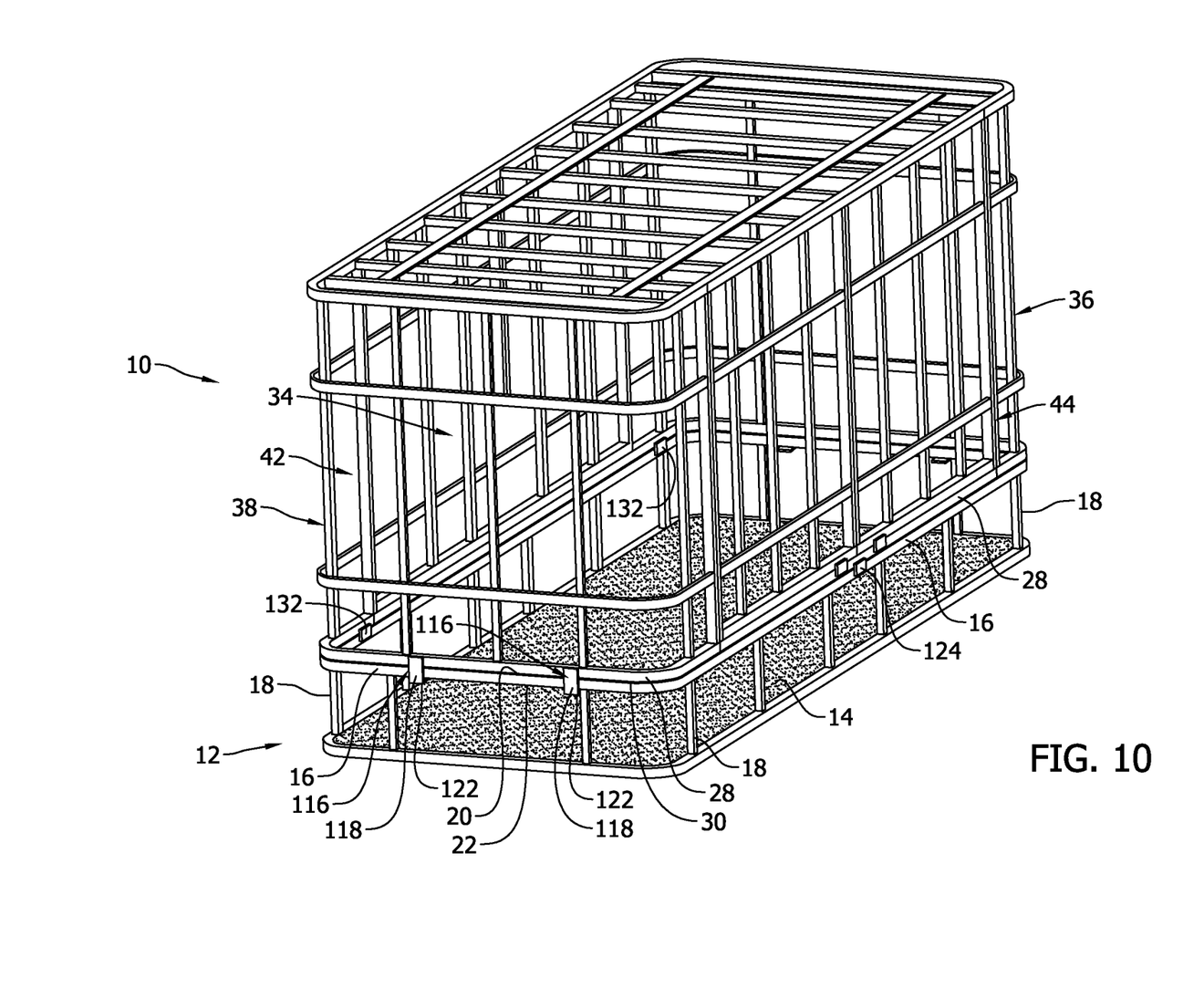
FIG. 10 is a representation of a partial, top perspective view of the front of the left side of the security cage enclosure structure assembled on a cargo carrier.
Figure 11:
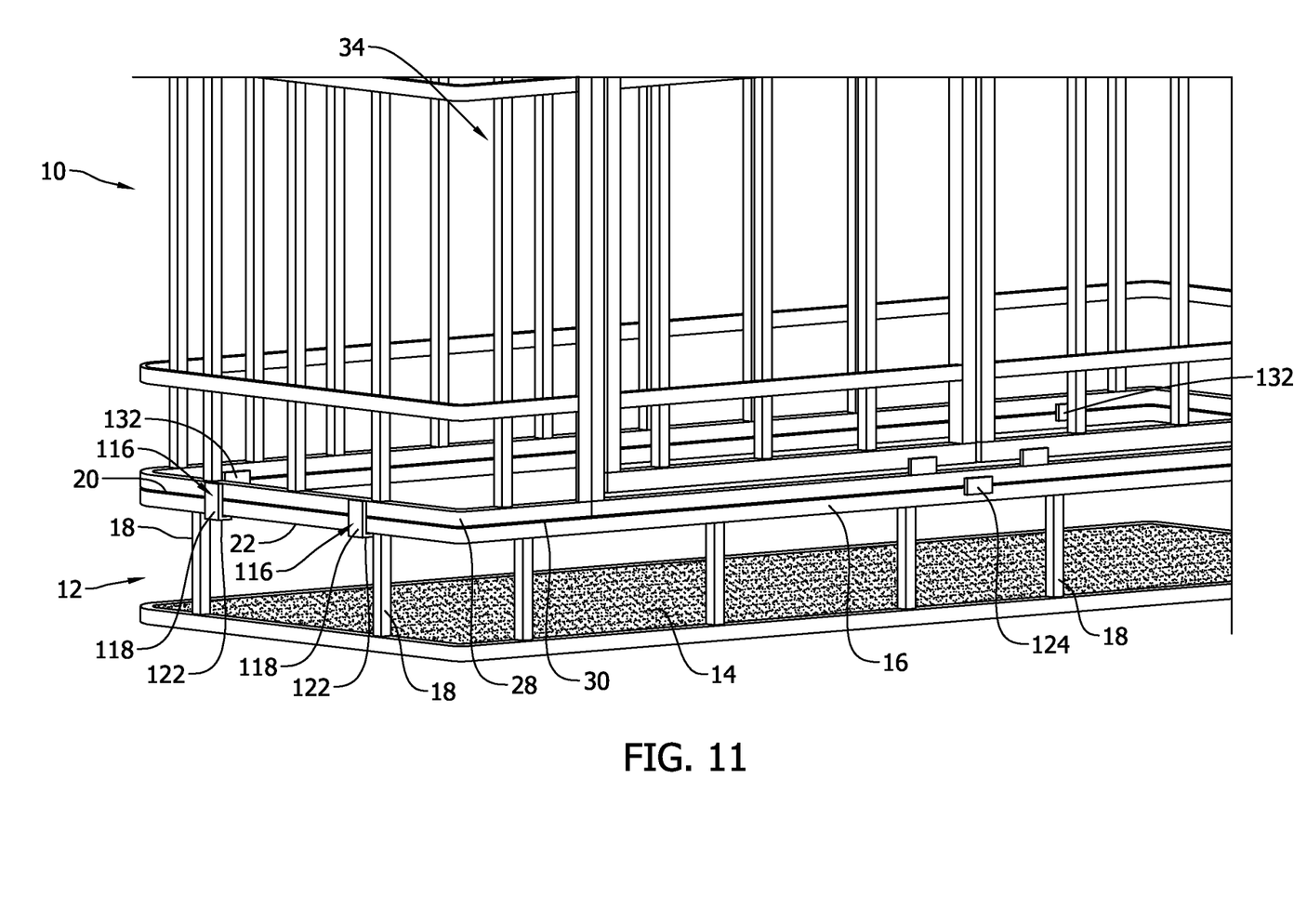
FIG. 11 is a representation of a partial, perspective view of the front of the left side of the security cage enclosure structure assembled on the cargo carrier.
Figure 12:
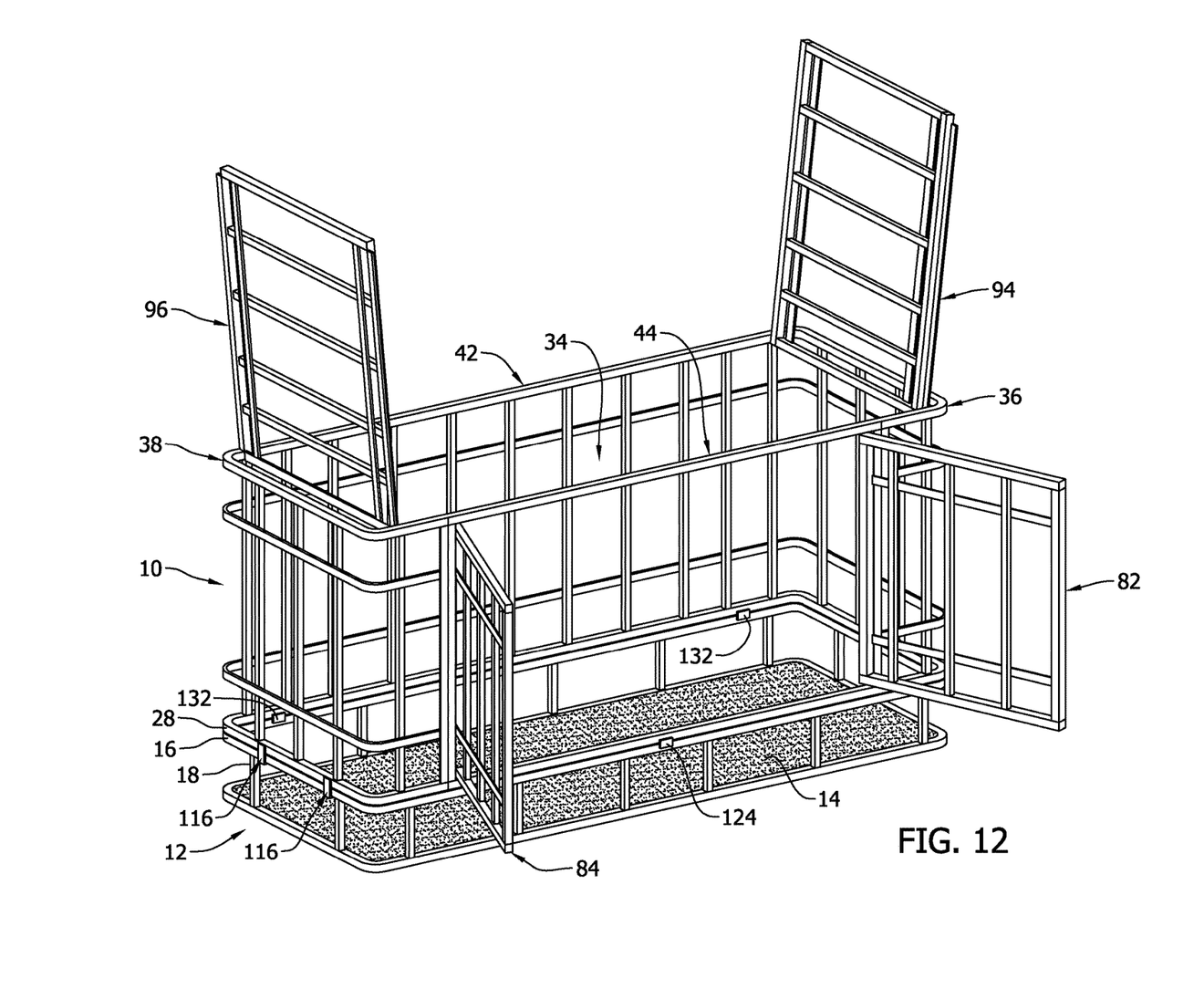
FIG. 12 is a representation of a partial, top perspective view of the security cage enclosure structure assembled on a cargo carrier with the front doors of the security cage in their open positions and the top doors of the security cage in their open positions.

In its basic form as represented in FIG. 1, the enclosure structure 10 is comprised of a first part of the structure or a right side of the enclosure structure and a second part of the structure or a left side of the enclosure structure. The first part and the second part are attached together when assembling the enclosure structure 10 on the top surface 20 of a cargo carrier 12 as represented in FIGS. 2 and 10-12. When the first part and the second part of the enclosure structure 10 are assembled on the top surface 20 of the cargo carrier 12 as represented in FIGS. 10-12, they enclose the interior volume 34 of the enclosure structure 10 above the platform surface 14 of the cargo carrier 12 and attach the enclosure structure 10 to the top surface 20 of the carrier rail 16 or the top surface 20 of the cargo carrier 12. The enclosure structure 10 is thereby attached to the cargo carrier 12 without the need for separate fastener assemblies.

Figure 13:
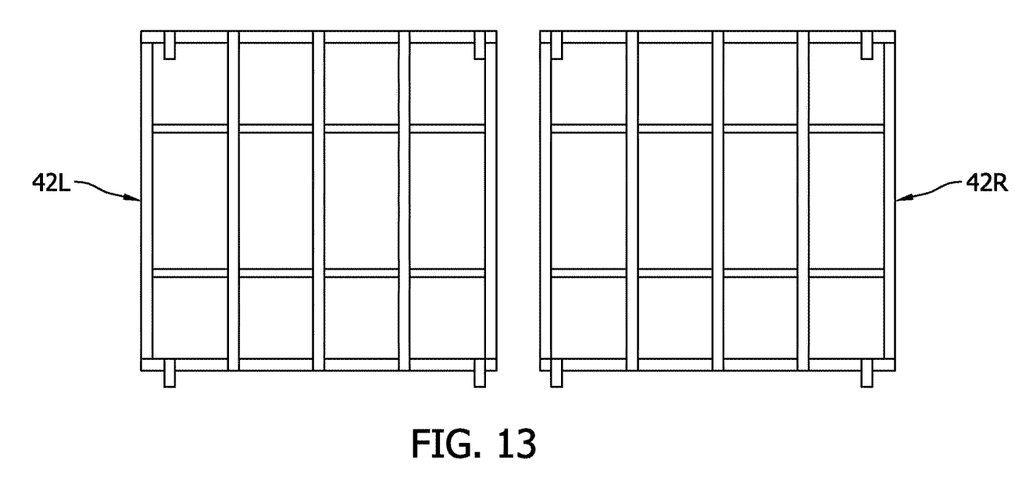
FIG. 13 is a representation of an elevation view of the two piece rear panel of the security cage enclosure structure viewed from the interior volume of the security cage enclosure structure.

As shown in FIG. 1, the first part of the enclosure structure 10 includes a right side panel 36 and the second part of the enclosure structure includes a left side panel 38. The first part of the enclosure structure 10 also includes a right side portion of a rear panel 42 and a right side portion of a front panel 44. The second part of the enclosure structure 10 includes the left side portion of the rear panel 42 and the left side portion of the front panel 44. FIG. 1 shows the right side portion and the left side portion of the rear panel 42 as one piece. FIG. 1 also shows the right side portion and the left side portion of the front panel 44 as one piece. However, the right side portion 42R and the left side portion 42L of the rear panel 42 could be two separate pieces of the rear panel as represented in FIG. 13. Additionally, the right side portion 44R and the left side portion 44L of the front panel 44 could be two separate pieces of the front panel as represented to FIG. 14. Providing the rear panel 42 and the front panel 44 as each being constructed from two separate pieces would result in a reduction in the package size needed for the security cage enclosure structure and a reduction in the shipping costs for the security cage enclosure structure. Referring to FIG. 1, the rear panel 42 and the front panel 44 are positioned on opposite sides of the enclosure structure 10 when assembling the enclosure structure on the top surface 20 of the cargo carrier 12. The right side panel 36 and the left side panel 38 are attached to the opposite ends of the rear panel 42 and the front panel 44 in assembling the enclosure structure 10 around the interior volume 34 of the enclosure structure and in assembling the enclosure structure 10 on the top surface 20 of the cargo carrier 12.

The construction of the right side panel 36 is represented in FIGS. 3-6. It should be understood that the construction of the left side panel 38 is basically the same as and is a mirror image of the construction of the right side panel 36. In view of this, only the construction of the right side panel 36 is described herein.

The right side panel 36 is comprised of a number of vertically oriented columns 46, 48. The columns 46, 48 are parallel and are spatially arranged around the right side panel 36. Several of the interior columns 46 are tubular and have generally square cross section configurations. The columns 48 at the opposite ends of the right side panel 46 are flat strips. The flat strips of the outer columns 48 are positioned in a same vertically oriented plane. The flat strips of the outer columns engage in surface contact with end columns of the rear panel 42 and end columns of the front panel 44 when attaching the right side panel 36 to the rear panel 42 and the front panel 44.

The right side panel 36 is also comprised of a number of horizontally oriented bars 52,54. The bars 52,54 are parallel and are spatially arranged on the right side panel 36. The bars 52,54 are secured to the columns 46, 48 of the right side panel. Interior bars 52 are formed as flat strips that are secured to the columns 46, 48 of the right side panel 36. The top and bottom bars 54 are tubular and have generally square cross section configurations. The top and bottom bars 54 are secured to the tops and bottoms of the columns 46, 48. A bottom surface 56 of the bottom bar 54 of the right side panel 36 forms a portion or a segment of the bottom surface 30 of the enclosure structure 10. The bottom bar of the left side panel 38 also has a bottom surface that forms a portion or a segment of the bottom surface 30 of the enclosure structure 10.

Figure 7:
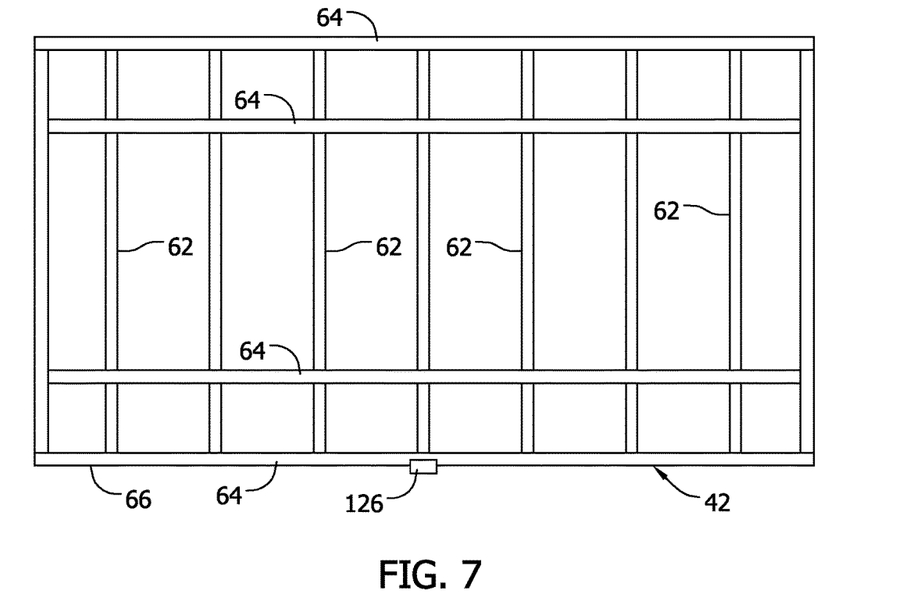
FIG. 7 is a representation of an elevation view of the one piece rear panel of the security cage enclosure structure viewed from the interior volume of the security cage enclosure structure.

The rear panel 42 of the enclosure structure 10 is represented in FIG. 7. The rear panel 42 is also comprised of several columns 62 that are vertically oriented, parallel and spatially arranged across the rear panel 42. The rear panel columns 62 are tubular and have generally square cross section configurations.

The rear panel 42 is also comprised of several bars that are secured to the columns 62 of the rear panel 42. The bars 64 are horizontally oriented, parallel and spatially arranged across the columns 62 of the rear panel 42. The bar 64 positioned at the bottom of the rear panel 42 has a bottom surface 66. The bottom surface 66 defines a portion or a segment of the bottom surface 30 of the enclosure structure 10. Thus, the bottom surface 66 of the bottom bar 64 is positioned in the same plane as the bottom surface 56 of the bottom bar 54 of the right side panel 36 and the bottom surface of the bottom bar of the left side panel 38.

Figure 8:
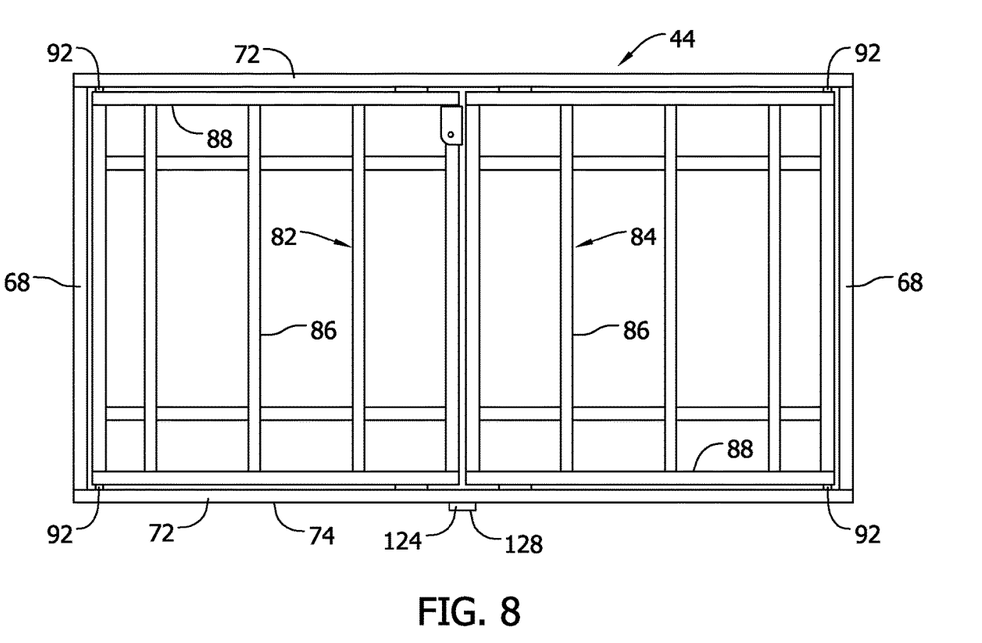
FIG. 8 is a representation of an elevation view of the one piece front panel of the security cage enclosure structure viewed from the interior volume of the security cage enclosure structure.
Figure 9:
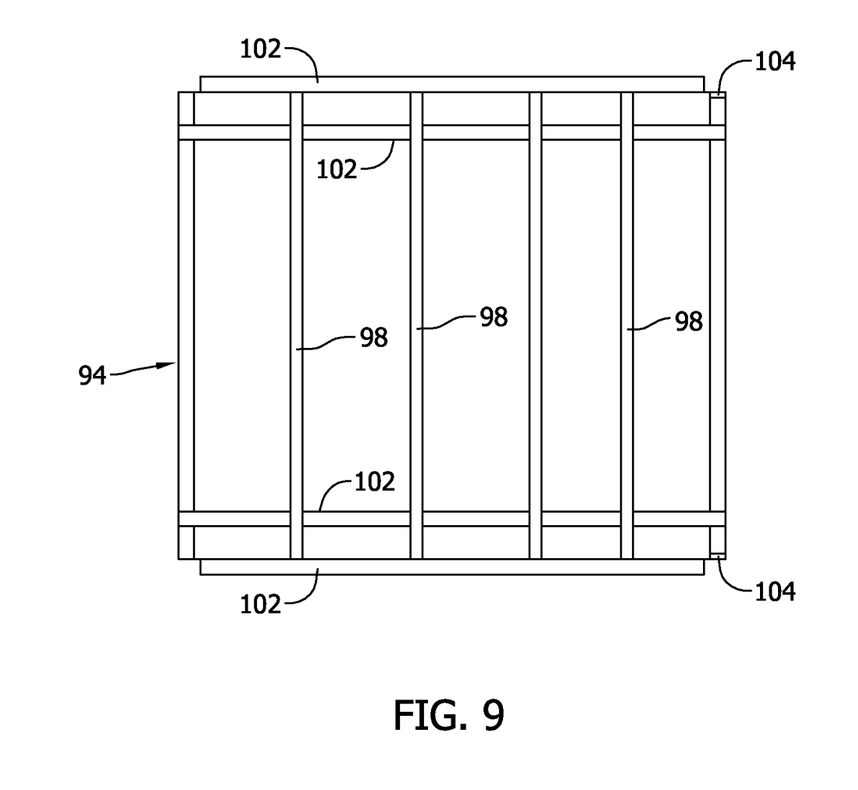
FIG. 9 is a representation of a plan view of a first top door of the security cage enclosure structure, with the second top door of the security cage enclosure structure being a duplicate thereof.

The front panel 44 of the enclosure structure 10 is represented in FIG. 8. The front panel 44 is also comprised of a pair columns 68 that are positioned at the opposite ends of the front panel 44. The front panel columns 68 are vertically oriented and are parallel. The columns 68 are tubular and have generally square cross section configurations.

The front panel 44 also includes bars 72 that extend across and are secured to the column 68. The bars 72 are positioned at the top and bottom of the front panel 44. The bars 72 with the columns 68 form a rectangular frame around the front panel 44. The bottom surface 74 of the bottom bar 72 of the front panel 44 forms a portion or a segment of the bottom surface 30 of the enclosure structure 10. Thus, the bottom surface 74 of the bottom bar 72 of the front panel 44 is positioned in the same plane as the bottom surface 66 of the rear panel 42, the bottom surface 56 of the right side panel 36 and the bottom surface of the left side panel 38.

There are a first front door 82 and a second front door 84 supported inside the front panel 44. The first front door 82 and the second front door 84 have substantially the same constructions. Both the first front door 82 and the second front door 84 are constructed of several columns 86 and bars 88. The columns 86 are vertically oriented, parallel and spatially arranged across the first front door 82 and the second front door 84. The bars 88 are horizontally oriented, parallel spatially arranged across the first front door 82 and the second front door 84 and are secured to the columns 86. Hinge connections 92 connect the first front door 82 and the second front door 84 to the front panel 44. The hinge connections 92 enable the first front door 82 and the second front door 84 to be pivoted relative to the front panel 44 between closed positions of the doors represented in FIG. 1 and opened positions of the doors represented in FIG. 12.

There is a first top door 94 and a second top door 96 on the top of the enclosure structure 10. The first top door 94 and the second top door 96 are represented in FIG. 1 in closed positions on the top of the enclosure structure 10 and are represented in FIG. 12 in open positions on the top of the enclosure structure 10. The first top door 94 and the second top door 96 have the same constructions. Both the first top door 94 and the second top door in 96 are constructed of side to side extending bars 98 and front to back extending bars 102. The side to side bars 98 and the front to back bars 102 are secured together in the crossing patterns represented in FIG. 1 and FIG. 12. Hinge connections 104 connect the first top door 94 and second top door 96 to the top of the enclosure structure 10. The hinge connections 104 enable the pivoting movement of the first top door 94 and second top door 96 between the closed positions represented in FIG. 1 and the opened positions represented in FIG. 12. Outer bars 106 of the side to side bars 98 are angle bars that engage on the tops of the rear panel 42 and the front panel 44 and support the first top door 94 and the second top door 96 in their closed positions represented in FIG. 1.

Several projections are provided on the enclosure structure 10. As will be explained, the projections are preferably formed unitary with the enclosure structure 10 extending downward from the bottom surface 30 of the enclosure structure. By being unitary with the enclosure structure, what is meant is that the projections are not secured by a separate fastener or fastener assembly to the enclosure structure but are secured to the enclosure structure by a means that does not require assembly of the projection to the enclosure structure. For example, the projection is secured to the enclosure structure by being cast or molded to the enclosure structure, welded to the enclosure structure, secured by a rivet to the enclosure structure, fused integrally with the enclosure structure by an adhesive or similar substance that causes the projection to fuse with the enclosure structure, or other equivalent means of the projection being unitary with the enclosure structure. The projections can be formed unitary with the enclosure structure by being formed unitary with the bars that form the bottom surface 30 of the enclosure structure 10. The projections can also be secured to the bars that form the bottom surface 30 of the enclosure structure 10 by being welded to the bars or being secured to the bars in an equivalent manner. The projections are unitary with the enclosure structure and fastener assemblies are not needed and are not used to secure the projections to the enclosure structure 10.

The projections include a first projection 106 represented in FIGS. 1-6, 10 and 12. Each projection formed unitary with the enclosure structure 10 has the same construction as the first projection 106 to be described. Therefore, only the construction of the first projection 106 and its unitary connection with the enclosure structure 10 is described herein. The constructions of the other projections on the enclosure structure 10 are the same as the first projection 106.

The first projection 106 is shown in FIG. 1 as being unitary with the right side panel 36 of the first part of the enclosure structure 10. As represented in FIG. 1, the first projection 106 is one of a pair of first projections on the right side panel 36. There is also an identical pair of projections on the left side panel 38. The projections are on the right side panel 36 and the left side panel 38 are positioned opposite each other on opposite sides of the enclosure structure 10 and on opposite sides of the bottom surface 30 of the enclosure structure.

As shown in FIGS. 1-5, 10 and 12, the first projection 106 is a rigid, flat strip having an angled configuration. The first projection 106 has a vertical portion 108 that is an upper portion of the rigid, flat strip of the first projection. The vertical portion 108 projects in a perpendicular orientation downward from the bottom surface 30 of the enclosure structure 10. The vertical portion 108 projects from the bottom surface 30 to a position spaced beneath the bottom surface 30. When assembling the enclosure structure 10 on the top surface 20 of the cargo carrier 12, the bottom surface 30 of the enclosure structure 10 is engaged in surface engagement with the top surface 20 of the cargo carrier 12 and the vertical portion 108 of the first projection 106 projects from the bottom surface 30 of the enclosure structure 10 to a position beneath the bottom surface 30 of the enclosure structure 10, beneath the top surface 20 of the cargo carrier 12 and beneath the bottom surface of the carrier rail 16.

The first projection 106 also has a horizontal portion 112 that is unitary with and extends in a perpendicular orientation from the vertical portion 108. The horizontal portion 112 of the first projection 106 is the lower portion of the rigid, flat strip of the first projection. The horizontal portion 112 extends from the vertical portion 108 to a position directly beneath the bottom surface 30 of the enclosure structure 10, directly underneath the top surface 20 of the cargo carrier 12 and directly beneath the bottom surface 22 of the carrier rail 16 when the bottom surface 30 of the enclosure structure 10 is engaged in surface engagement with the top surface 20 of the cargo carrier 12. The vertical portion 108 of the first projection 106 is dimensioned so that the horizontal portion 112 of the first projection 106 engages in surface contact with the bottom surface 22 of the carrier rail 16.

The second projection 116 is represented in FIGS. 2, 10, 11 and 12 on the opposite side of the enclosure structure 10 from the first projection 106. As represented in FIGS. 2, 10, 11 and 12, the second projection 116 is one of a pair of projections provided on the second part of the enclosure structure 10 or on the left side panel 38.

The second projection 116 is a rigid, flat strip having an angled configuration. The second projection 116 has a vertical portion 118 that is an upper portion of the rigid, flat strip of the second projection. The vertical portion 118 projects in a perpendicular orientation downward from the bottom surface 30 of the enclosure structure 10. The vertical portion 118 projects from the bottom surface 30 to a position spaced beneath the bottom surface 30. When assembling the enclosure structure 10 on the top surface of the cargo carrier 12, the bottom surface 30 of the enclosure structure 10 is engaged in surface engagement with the top surface 20 of the cargo carrier 12 and the vertical portion 118 of the second projection 116 projects from the bottom surface 30 of the enclosure structure to a position beneath the bottom surface 30 of the enclosure structure 10 and a position beneath the top surface 20 of the cargo carrier 12 and beneath the bottom surface 22 of the carrier rail 16.

The second projection 116 also has a horizontal portion 122 that is unitary with and extends in a perpendicular orientation from the vertical portion 118. The horizontal portion 122 of the second projection 116 is the lower portion of the rigid, flat strip of the second projection. The horizontal portion 122 extends from the vertical portion 118 to a position directly beneath the bottom surface 30 of the enclosure structure 10 and a position directly beneath the top surface 20 of the cargo carrier 12 and directly beneath the bottom surface 22 of the carrier rail 16 when the bottom surface 30 of the enclosure structure 10 is engaged in surface engagement with the top surface 20 of the cargo carrier 12. The vertical portion 118 of the second projection 116 is dimensioned so that the horizontal portion 122 of the second portion 116 engages in surface contact with the bottom surface 22 of the carrier rail 16.

A first tab 124 is unitary with the enclosure structure 10. Specifically, the first tab 124 is unitary with the front panel 44 of the enclosure structure 10 as shown in FIGS. 1, 8, 10 and 12.

Figure 2:
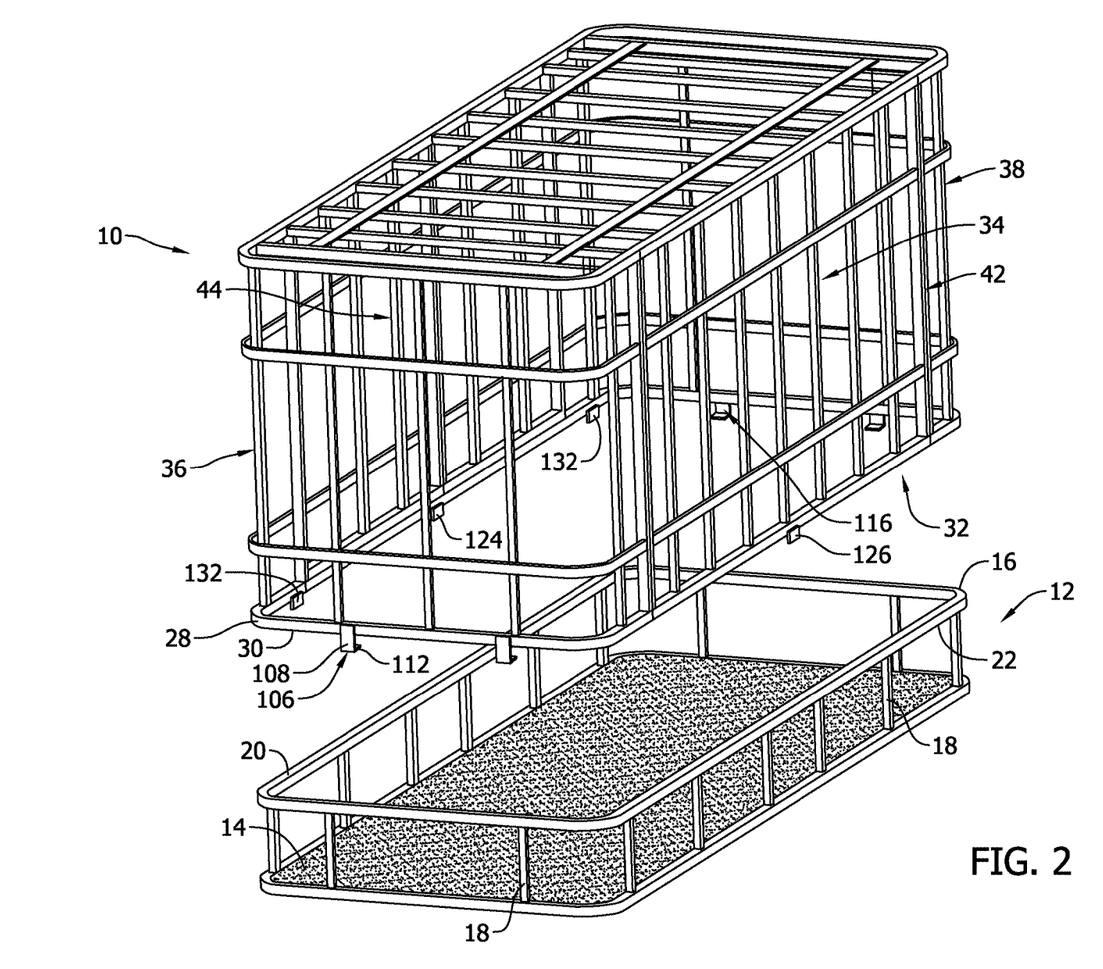
FIG. 2 is a representation of a top, right side perspective view of the rear of the security cage enclosure structure positioned above a cargo carrier.
Figure 3:
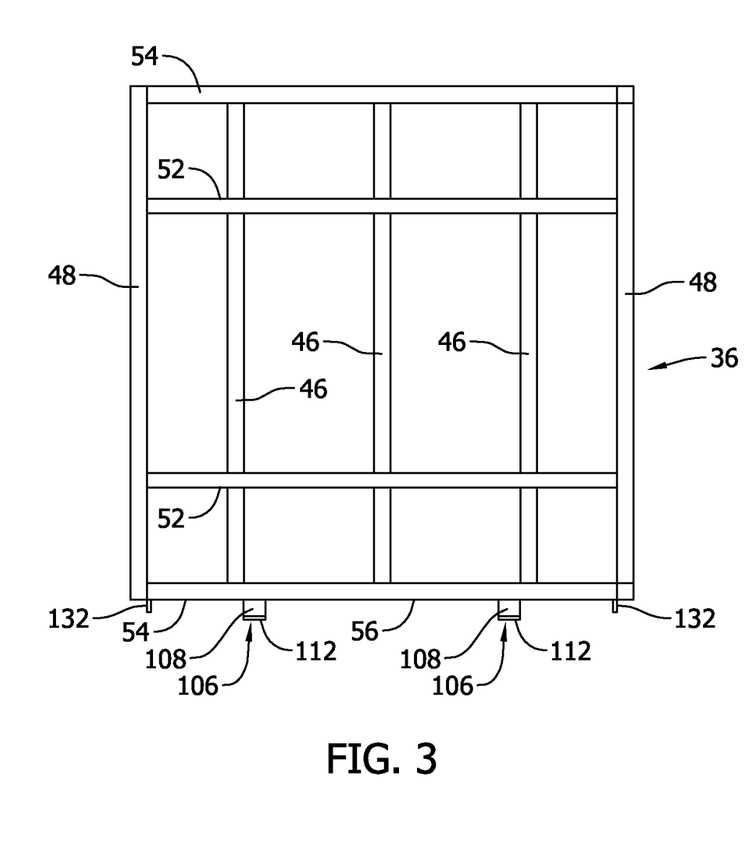
FIG. 3 is a representation of an elevation view of a right side panel of the security cage enclosure structure viewed from the interior volume of the security cage enclosure structure, with it understood that the left side panel of the security cage enclosure structure is a mirror image of FIG. 3.
Figure 4:
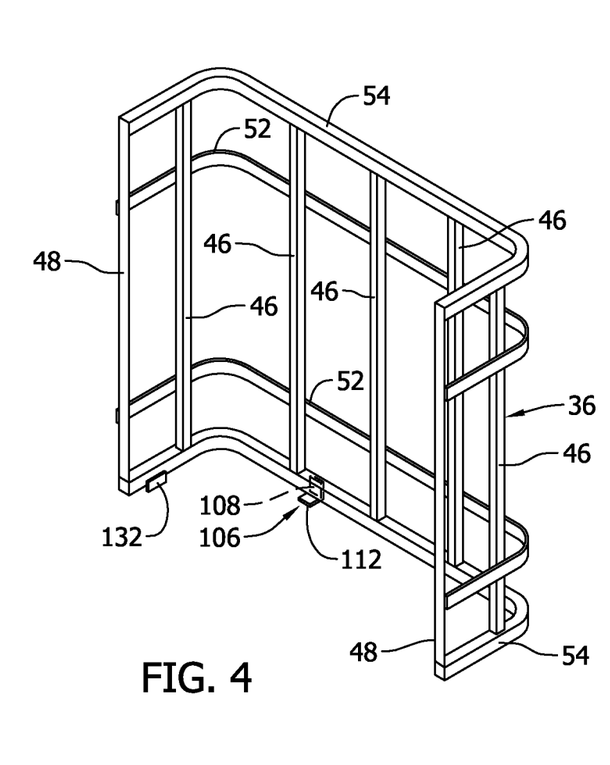
FIG. 4 is a representation of a top, perspective view of the right side panel of the security cage enclosure structure.
Figure 5:
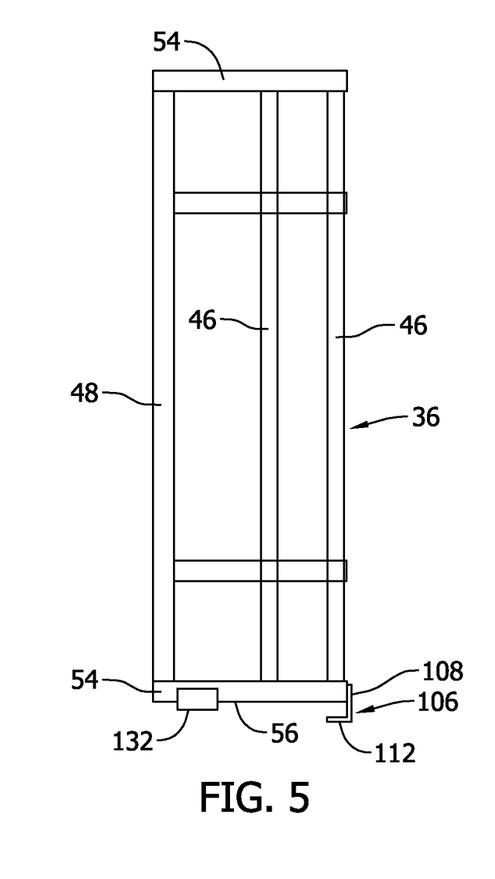
FIG. 5 is a representation of an elevation view of the front of the right side panel of FIG. 4, with the elevation view of the rear of the right side panel being a mirror image of FIG. 5.
Figure 6:
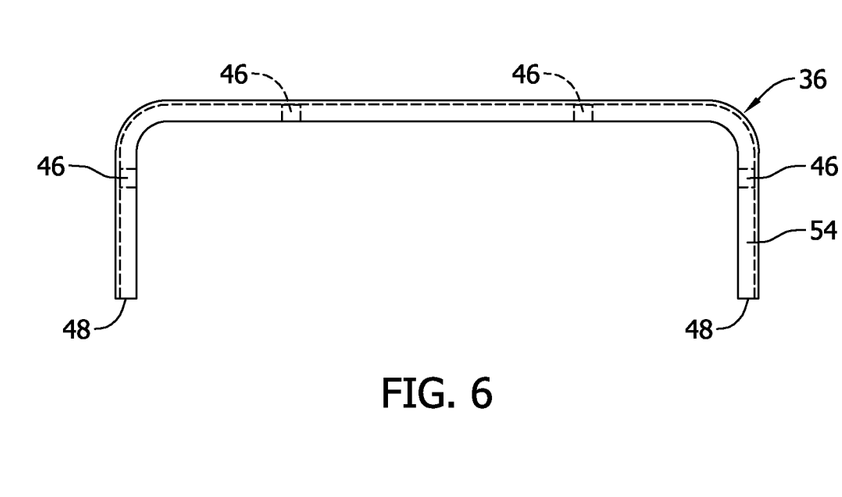
FIG. 6 is a representation of a top plan view of the right side panel of FIG. 4.

A second tab 126 is unitary with the enclosure structure 10. Specifically, the second tab 126 is unitary with the rear panel 42 of the enclosure structure as shown in FIGS. 2 and 7.

The first tab 124 and the second tab 126 are on opposite sides of the enclosure structure 10 and on opposite sides of the bottom surface 30 of the enclosure structure. The first tab 124 and the second tab 126 have identical constructions and therefore only the construction of the first tab 124 is described herein.

The first tab 124 is a rigid, flat strip. As represented in FIGS. 1, 8, 10 and 12, the first tab 124 is unitary with the front panel 44 and specifically is unitary with the front panel bottom bar 72. The first tab 124 projects vertically downward from the bottom surface 74 of the front panel bar 72 and projects vertically downward from the bottom surface 30 of the enclosure structure 10. The first tab 124 projects downward to a bottom end 128 of the first tab 124 that is positioned beneath the bottom surface 30 of the enclosure structure 10.

The first tab 124 and the second tab 126 are shown in FIGS. 1, 2, 7, 8, 10 and 12 positioned on the outside or on the exterior of the enclosure structure 10. There are also additional tabs 132 positioned on the interior of the enclosure structure 10. The additional tabs 132 are unitary with the right side panel 36 and the left side panel 38 as shown in FIGS. 2-5 and 10-12. When the enclosure structure 10 is positioned on the top surface 20 of the of the cargo carrier 12 and is secured to the cargo carrier 12, the first tab 124 and second tab 126 extend downward over the exterior of the carrier rail top surface 20 and the additional tabs 132 extend downward over the interior of the carrier rail top surface 20. With the carrier rail top surface 20 positioned between the first tab, the second tab 126 and the additional tabs 132, the tabs prevent movement of the bottom surface 30 of the enclosure structure 10 and prevent movement of the enclosure structure 10 on the top surface 20 of the carrier rail 20 and on the cargo carrier 12. In this manner, the enclosure structure 10 is prevented from sliding off the top surface 20 of the cargo carrier 12 by the first tab 124, the second tab 126 and the additional tabs 132 projecting vertically from the bottom surface 30 of the enclosure structure 10 to the bottom ends of the first tab 124, the second tab 126 and the additional tabs 132 being positioned beneath the top surface 20 of the cargo carrier 12.

The security cage enclosure structure 10 is assembled to the cargo carrier 12 by positioning the first part of the enclosure structure 10 that includes the right side panel 36 and the second part of the enclosure structure 10 that includes the left side panel 38 on the top surface 20 of the cargo carrier 12. The rear panel 42 of the enclosure structure 10 and the front panel 44 of the enclosure structure 10 are also positioned on the top surface 20 of the cargo carrier 12. The bottom surface 30 of the enclosure structure 10 which consists of portions or segments of the bottom surface of the right side panel 36, the left side panel 38, the rear panel 42 and the front panel 44 is engaged in service engagement on the top surface 20 of the cargo carrier 12. The first part and the second part of the enclosure structure 10 are then assembled together with the vertical portions 108, 118 of the respective first projection 106 and the second projection 116 projecting beneath the top surface 20 of the carrier rail 16 and beneath the bottom surface 22 of the carrier rail 16, with the tabs 124, 126, 132 projecting beneath the top surface 20 of the carrier rail 16. The horizontal portions 112, 122 of the respective first projection 106 and the second projection 116 extend directly underneath the carrier rail 16 and thereby directly underneath the top surface 20 of the cargo carrier 12 and directly underneath the bottom surface 22 of the carrier rail 16.

With the right side panel 36 and the left side panel 38, the rear panel 42 and the front panel 44 positioned on the top surface 20 of the carrier rail 16 and thereby on the top surface of the cargo carrier 12, the right side panel 36 and the left side panel 38 are assembled to opposite ends of the rear panel 42 and opposite ends of the front panel 44 by fastener assemblies or other equivalent fasteners while positioning the horizontal portions 112, 122 of the respective first projection 106 and the second projection 116 directly underneath the carrier rail top surface 20 and directly underneath the carrier rail bottom surface 22 of the cargo carrier 12.

The horizontal portions 112, 122 of the first projection 106 and the second projection 116 positioned directly underneath the top surface 20 and the bottom surface 22 of the carrier rail 16 of the cargo carrier 12 attaches the security cage enclosure structure 10 to the cargo carrier 12.

As described earlier, FIG. 13 is a representation of the rear panel of the enclosure structure constructed as a two piece panel comprising a right side portion 42R of the rear panel and a left side portion 42L of the rear panel. The right side portion 42R and the left side portion 42L are constructed in substantially the same manner as the rear panel 42 described earlier. In assembling the enclosure structure 10 that comprises the right side panel 42R and the left side panel 42L, the right side panel 42R and left side panel 42L are assembled together side by side as represented in FIG. 13 by separate fastener assemblies or any other equivalent method known by the artisan of ordinary skill.

Figure 14:
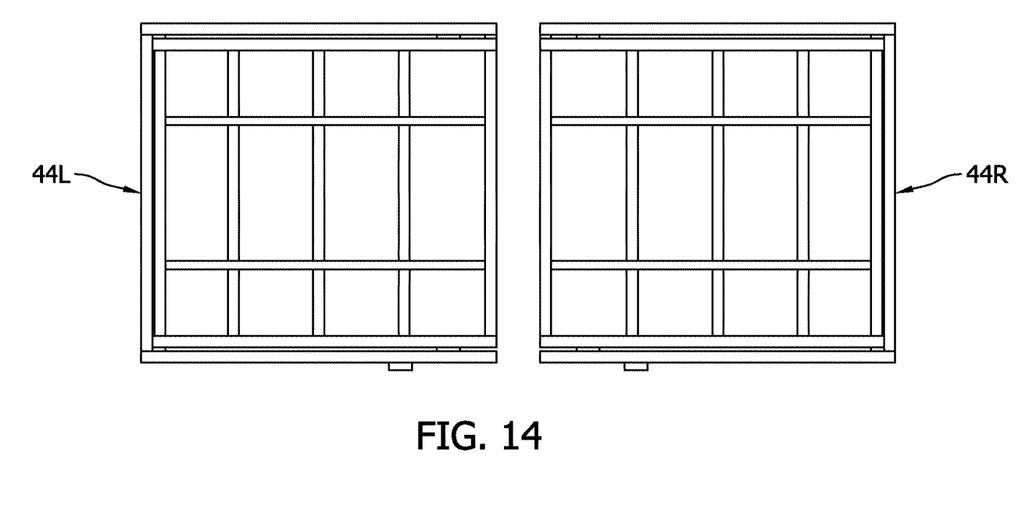
FIG. 14 is a representation of an elevation view of the two piece front panel of the security cage enclosure structure viewed from the interior of the security cage enclosure structure.

FIG. 14 is a representation of the front panel of the enclosure structure 10 constructed as a two piece panel comprising a right side portion 44R of the front panel and a left side portion 44L of the front panel. The right side portion 44R and the left side portion 44L of the front panel are constructed in substantially the same manner as the front panel 44 of the enclosure structure 10 described earlier. In assembling the enclosure structure 10 that comprises the right side portion 44R of the front panel and the left side portion 44L of the front panel, the right side portion 44R of the front panel and the left side portion 44L of the front panel are assembled together side by side as represented in FIG. 14 by separate fastener assemblies or by any other equivalent method known to the artisan of ordinary skill.

Figure 15:
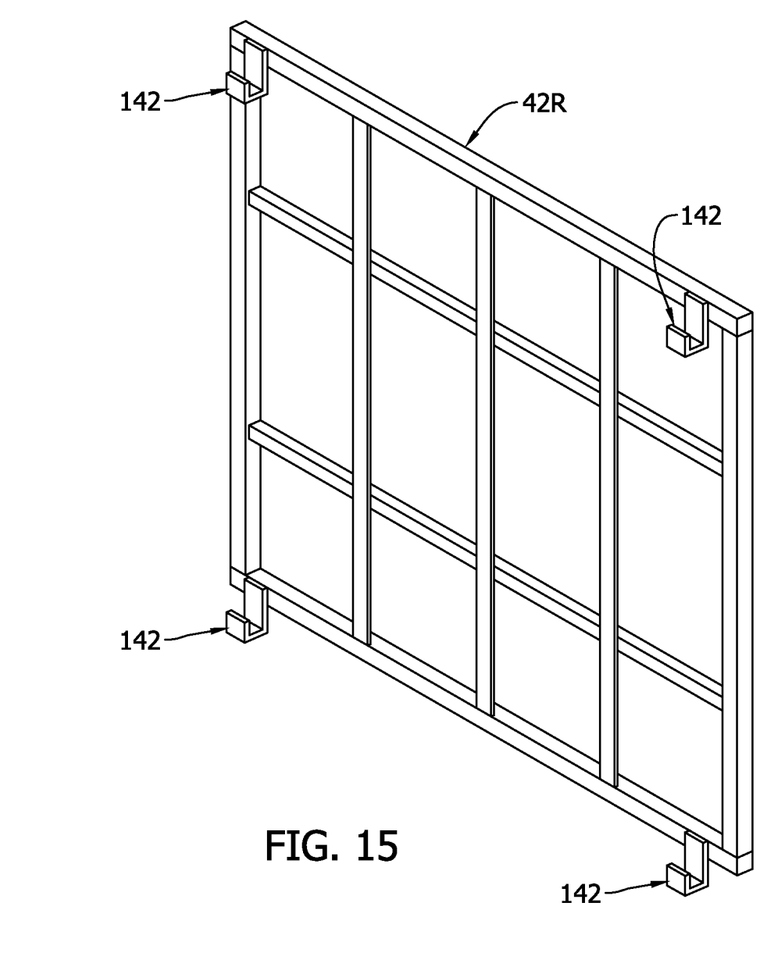
FIG. 15 is a representation of a top, perspective view of one of the two piece rear panels of the security cage enclosure structure.

FIG. 15 is a representation of the right side portion of the rear panel 42R of the enclosure structure 10. It should be understood that both portions 42R, 42L of the rear panel have the same construction as that represented in FIG. 15. As represented in FIG. 15, both portions 42R, 42L of the rear panel are provided with strips formed as hooks 142. The hooks 142 are shown positioned at the four corners of the portion 42R of the rear panel. The hooks 142 are provided in an embodiment of the enclosure structure 10 that comprises top doors 94, 96 that are removable from the enclosure structure 10. The top doors 94, 96 can be removed from the top of the enclosure structure 10 to provide unobstructed access into the interior volume 34 of the enclosure structure 10 from the top of the enclosure structure. When the top doors 94, 96 are removed from the enclosure structure 10 they can be positioned on the hooks 142 to store the doors 94, 96 in the interior of the enclosure structure 10 when not in use. The hooks 142 inside each of the right side portion 42R and the left side portion 42L of the rear panel securely hold the top doors 94, 96 in the interior of the enclosure structure 10 when the doors have been removed from the enclosure structure.

In view of the above, it will be seen that the several objects and advantages of the present invention have been achieved and other advantageous results have been obtained.

As various changes could be made in the above constructions of the security cage enclosure structure without departing from the scope of the invention, it is intended that all matter contained in the above description or shown in the accompanying drawings shall be interpreted as illustrative and not in a limiting sense.

The invention claimed is:

1. A method of assembling an enclosure structure to a cargo carrier, the method comprising:
    positioning a first part and a second part of an enclosure structure on a top surface of a cargo carrier;
    assembling the first part and the second part of the enclosure structure together with a vertical portion of a first projection on the first part projecting beneath the top surface of the cargo carrier and with a horizontal portion of the first projection extending underneath the top surface of the cargo carrier, and with a vertical portion of a second projection on the second part projecting beneath the top surface of the cargo carrier and with a horizontal portion of the second projection extending underneath the top surface of the cargo carrier.

2. The method of claim 1, further comprising:
    the first part is a right side panel of the enclosure structure;
    the second part is a left side panel of the enclosure structure;
    positioning a rear panel of the enclosure structure on the top surface of the cargo carrier;
    positioning a front panel of the enclosure structure on the top surface of the cargo carrier;
    attaching the right side panel and the left side panel to opposite ends of the rear panel and the front panel while positioning the horizontal portion of the first projection underneath the top surface of the cargo carrier and positioning the horizontal portion of the second projection underneath the top surface of the cargo carrier.

3. An enclosure for a cargo carrier, the enclosure comprising:
- an enclosure structure having a bottom surface, the bottom surface being configured to engage on a top surface of a cargo carrier;
- a first projection on the enclosure structure, the first projection having a vertical portion that projects from the bottom surface of the enclosure structure to a position beneath the bottom surface of the enclosure structure and beneath a top surface of a cargo carrier when the bottom surface of the enclosure structure is engaged on the top surface of the cargo carrier;
- the first projection having a horizontal portion that is unitary with and extends from the vertical portion of the first projection to a position underneath the bottom surface of the enclosure structure and underneath the top surface of the cargo carrier when the bottom surface of the enclosure structure is engaged on the top surface of a cargo carrier;
- a second projection on the enclosure structure, the second projection having a vertical portion that projects from the bottom surface of the enclosure structure to a position beneath the bottom surface of the enclosure structure and beneath the top surface of the cargo carrier when the bottom surface of the enclosure structure is engaged on the top surface of the cargo carrier;
- the second projection having a horizontal portion that is unitary with and extends from the vertical portion of the second projection to a position underneath the bottom surface of the enclosure structure and underneath the top surface of the cargo carrier when the bottom surface of the enclosure structure is engaged on the top surface of the cargo carrier;
- whereby the enclosure structure is attached to the top surface of the cargo carrier by the horizontal portion of the first projection and the horizontal portion of the second projection extending underneath the top surface of the cargo carrier.

4. The enclosure of claim 3, further comprising:
the first projection and the second projection are unitary with the enclosure structure and are on opposite sides of the bottom surface.

5. The enclosure of claim 3, further comprising:
the first projection and the second projection are unitary with the enclosure structure and are on opposite sides of the enclosure structure.

6. The enclosure of claim 5, further comprising:
the enclosure structure has a first part and a second part;
the first part and the second part are attached together when constructing the enclosure structure on the top surface of the cargo carrier;
the first projection is on the first part; and
the second projection is on the second part.

7. The enclosure of claim 6, further comprising:
when the first part and the second part are attached together on the top surface of the cargo carrier, the vertical portions of the first projection and the second projection project below the top surface of the cargo carrier and the horizontal portions of the first projection and the second projection extend underneath a bottom surface of the cargo carrier.

8. The enclosure of claim 3, further comprising:
the first projection is a rigid, flat strip having an angled configuration; and
the second projection is a rigid, flat strip having an angled configuration.

9. The enclosure of claim 8, further comprising:
the first projection vertical portion is an upper portion of the rigid, flat strip of the first projection and the first projection horizontal portion is a lower portion of the rigid, flat strip of the first projection; and
the second projection vertical portion is an upper portion of the rigid, flat strip of the second projection and the second projection horizontal portion is a lower portion of the rigid, flat strip of the second projection.

10. The enclosure of claim 3, further comprising:
a first tab unitary with the enclosure structure, the first tab projecting vertically from the bottom surface of the enclosure structure to a bottom end of the first tab positioned beneath the bottom surface of the enclosure structure; and
a second tab unitary with the enclosure structure, the second tab projecting vertically from the bottom surface of the enclosure structure to a bottom end of the second tab positioned beneath the bottom surface of the enclosure structure;
whereby the enclosure structure is prevented from sliding off the top surface of the cargo carrier by the first tab and the second tab projecting vertically from the bottom surface of the enclosure structure to the bottom ends of the first tab and the second tab positioned beneath the top surface of the cargo carrier.

11. The enclosure of claim 3, further comprising:
the enclosure structure is attached to the cargo carrier solely by the horizontal portions of the first projection and the second projection extending underneath the top surface of a cargo carrier.

12. The enclosure of claim 3, further comprising:
the enclosure structure having a right side panel and a left side panel that are positioned on opposite sides of the enclosure structure when assembling the enclosure structure on the top surface of the cargo carrier;
the enclosure structure having a rear panel and a front panel that are positioned on opposite sides of the enclosure structure when assembling the enclosure structure on the top surface of the cargo carrier;
the right side panel and the left side panel are attachable to opposite ends of the rear panel and the front panel when assembling the enclosure structure on the top surface of the cargo carrier;
the first projection is unitary with the right side panel;
the second projection is unitary with the left side panel;
with the right side panel, the left side panel, the rear panel and the front panel positioned on the top surface of the cargo carrier when assembling the enclosure structure on the top surface of the cargo carrier, the horizontal portion of the first projection and the horizontal portion of the second projection extend underneath the top surface of the cargo carrier and attach the enclosure structure on the top surface of the cargo carrier.

13. An enclosure for a cargo carrier, the enclosure comprising:
- an enclosure structure, the enclosure structure having an interior volume that is enclosed by the enclosure structure, the enclosure structure having an opening at a bottom of the enclosure structure, the opening providing access to the interior volume of the enclosure structure through the opening;
- a bottom surface on the enclosure structure, the bottom surface having a configuration of a border surface that extends entirely around an outer perimeter of the opening of the enclosure structure, the bottom surface being positioned in a single bottom plane, the bottom surface being configured to engage in surface contact with a top surface of a cargo carrier;

a first projection unitary with the enclosure structure, the first projection having a vertical portion that projects in a perpendicular orientation from the bottom surface of the enclosure structure to a position beneath the bottom surface, the first projection having a horizontal portion that is unitary with and extends in a perpendicular orientation from the vertical portion to a position underneath the bottom surface of the enclosure structure;

a second projection unitary with the enclosure structure, the second projection having a vertical portion that projects in a perpendicular orientation from the bottom surface of the enclosure structure to a position beneath the bottom surface, the second projection having a horizontal portion that is unitary with and extends in a perpendicular orientation from the vertical portion of the second projection to a position underneath the bottom surface of the enclosure structure;

whereby with the bottom surface of the enclosure structure engaged in surface contact with a top surface of a cargo carrier, the vertical portions of the first projection and the second projection project from the bottom surface of the enclosure structure to positions beneath the bottom surface of the enclosure structure and beneath the top surface of the cargo carrier, and the horizontal portions of the first projection and the second projection extend from the vertical portions of the first projection and the second projection to positions underneath the bottom surface of the enclosure structure and underneath the top surface of the cargo carrier and attach the enclosure structure to the cargo carrier.

14. The enclosure of claim 13, further comprising:
the first projection and the second projection are on opposite sides of the bottom surface of the enclosure structure.

15. The enclosure of claim 14, further comprising:
the first projection is a rigid, flat strip having an angled configuration; and
the second projection is a rigid, flat strip having an angled configuration.

16. The enclosure of claim 15, further comprising:
the first projection vertical portion is an upper portion of the rigid, flat strip of the first projection and the first projection horizontal portion is a lower portion of the rigid, flat strip of the first projection; and
the second projection vertical portion is an upper portion of the rigid, flat strip of the second projection and the second projection horizontal portion is a lower portion of the rigid, flat strip of the second projection.

17. The enclosure of claim 13, further comprising:
the enclosure structure is attached to the top surface of the cargo carrier solely by the horizontal portions of the first projection and the second projection.

18. The enclosure of claim 13, further comprising:
the enclosure structure has a first part and a second part that are attached together on the top surface of the cargo carrier to enclose the interior volume of the enclosure structure;
the first projection is unitary with the first part; and
the second projection is unitary with the second part.

19. The enclosure of claim 18, further comprising:
as the first part and the second part of the enclosure structure are attached together on the top surface of the cargo carrier, the vertical portions of the first projection and the second projection project beneath the top surface of the cargo carrier and the horizontal portions of the first projection and the second projection extend underneath the top surface of the cargo carrier.

20. The enclosure of claim 13, further comprising:
the enclosure structure having a right side panel and a left side panel that are positioned on opposite sides of the interior volume;
the enclosure structure having a rear panel and a front panel that are positioned on opposite sides of the interior volume;
the right side panel and the left side panel are attachable to opposite ends of the rear panel and the front panel in assembling the enclosure structure around the interior volume on the top surface of the cargo carrier;
the first projection is on the right side panel;
the second projection is on the left side panel;
with the right side panel, the left side panel, the rear panel and the front panel positioned on the top surface of the cargo carrier, the horizontal portions of the first projection and the second projection extending underneath the top surface of the cargo carrier attaches the enclosure structure to the cargo carrier.

* * * * *